US011254349B2

(12) United States Patent
Palmer et al.

(10) Patent No.: US 11,254,349 B2
(45) Date of Patent: Feb. 22, 2022

(54) LINEAR WORM AND WORM GEAR ASSEMBLY

(71) Applicant: Steering Solutions IP Holding Corporation, Saginaw, MI (US)

(72) Inventors: Caleb S. Palmer, Freeland, MI (US); Travis L. Palmer, Frankenmuth, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 182 days.

(21) Appl. No.: 16/598,827

(22) Filed: Oct. 10, 2019

(65) Prior Publication Data

US 2021/0107556 A1 Apr. 15, 2021

(51) Int. Cl.
*B62D 5/00* (2006.01)
*B62D 5/04* (2006.01)

(52) U.S. Cl.
CPC ........... *B62D 5/006* (2013.01); *B62D 5/0403* (2013.01); *B62D 5/0409* (2013.01)

(58) Field of Classification Search
CPC .... B62D 5/006; B62D 5/0403; B62D 5/0409; B62D 5/001
See application file for complete search history.

(56) References Cited

U.S. PATENT DOCUMENTS

| 6,386,056 | B1 * | 5/2002 | Bachnak | B62D 5/0403 74/425 |
|---|---|---|---|---|
| 6,516,915 | B2 | 2/2003 | Kurokawa et al. | |
| 2014/0190762 | A1 * | 7/2014 | Kiyota | G01L 3/101 180/444 |
| 2016/0264171 | A1 * | 9/2016 | Zaike | B62D 5/0403 |
| 2017/0029017 | A1 * | 2/2017 | Pattok | B62D 5/0448 |
| 2019/0092374 | A1 * | 3/2019 | Nofzinger | B62D 5/0421 |
| 2019/0120711 | A1 * | 4/2019 | Singh | B05B 7/1404 |
| 2021/0053611 | A1 * | 2/2021 | Washnock | F16H 1/20 |
| 2021/0108705 | A1 * | 4/2021 | Palmer | F16H 55/22 |

* cited by examiner

*Primary Examiner* — Tony H Winner
(74) *Attorney, Agent, or Firm* — Dickinson Wright PLLC

(57) ABSTRACT

A power steering assembly includes a first housing containing a worm gear operatively coupled to a steering shaft, the worm gear rotatable about a worm gear axis. The power steering assembly also includes a second housing containing an electric motor and a worm arranged to engage the worm gear. The power steering assembly further includes a worm gear axis bearing disposed between the worm gear and an inner surface of the first housing, the worm gear axis bearing protruding from the second housing to position the first housing relative to the worm gear axis.

13 Claims, 3 Drawing Sheets

LINEAR WORM AND WORM GEAR ASSEMBLY

BACKGROUND OF THE INVENTION

Vehicles may employ a power steering assist mechanism that provides torque assist to a steering shaft of the vehicle through a worm/worm gear reduction assembly. There are many known methods for setting the friction of a worm and worm gear set. Examples include eccentric bushings, spring-loaded assemblies, and linear movement of the worm or worm gear. For linear movement assembly processes, the worm and the worm gear are in separate housings that are allowed to move relative to each other so they can be adjusted until the friction setting is as desired. Such assemblies may include three points of contact between the housings and for the sliding motion. However, binding and dimensional stack-up are issues that must be addressed in these types of assemblies.

SUMMARY OF THE DISCLOSURE

According to one aspect of the disclosure, a power steering assembly includes a first housing containing a worm gear operatively coupled to a steering shaft, the worm gear rotatable about a worm gear axis. The power steering assembly also includes a second housing containing an electric motor and a worm arranged to engage the worm gear. The power steering assembly further includes a worm gear axis bearing disposed between the worm gear and an inner surface of the first housing, the worm gear axis bearing protruding from the second housing to position the first housing relative to the worm gear axis.

According to another aspect of the disclosure, a power steering assembly includes a first housing containing a worm gear operatively coupled to a steering shaft, the worm gear rotatable about a worm gear axis. The power steering assembly also includes a second housing containing an electric motor and a worm arranged to engage the worm gear. The power steering assembly further includes a worm gear axis bearing protruding from the second housing to position the first housing relative to the worm gear axis. The power steering assembly yet further includes an aperture wall of the second housing that defines an aperture for receiving the worm gear axis bearing, the aperture wall including a pair of flat portions for engaging a rounded exterior of the worm gear axis bearing.

According to another aspect of the disclosure, a method of assembling a power steering assembly is provided. The method includes press fitting a worm gear axis bearing around a portion of a worm gear and into a first housing, the worm gear axis bearing protruding from the first housing. The method also includes positioning the worm gear axis within an aperture defined by an aperture wall of a second housing. The method further includes sliding the second housing along the worm gear axis bearing. The method yet further includes coupling the second axis to the first axis with a plurality of mechanical fasteners.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, the invention will be described with reference to specific embodiments without limiting same. It is to be understood that the disclosed embodiments are merely illustrative of the present disclosure that may be embodied in various and alternative forms. Various elements of the disclosed embodiments may be combined or omitted to form further embodiments of the present disclosure. The Figures are not necessarily to scale, as some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
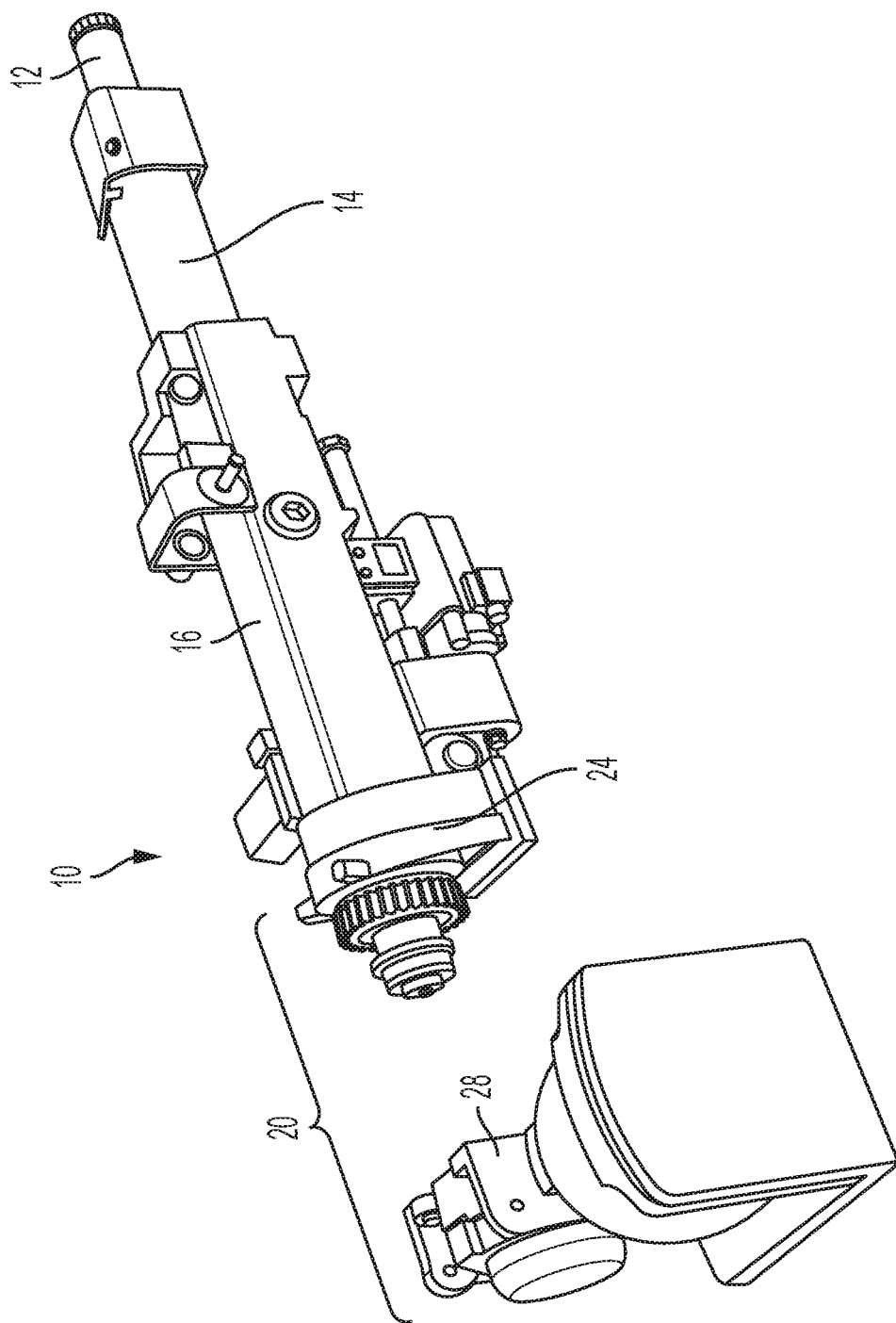
FIG. 1 is a perspective view of a portion of a power steering assembly.

Referring to FIG. 1, a portion of a steering column assembly is illustrated and generally referenced with numeral 10. The steering column assembly 10 includes a steering shaft 12 that is operatively coupled to a steering input device, such as a steering wheel, at one end and to one or more intermediate components that transfer rotation of the steering shaft to road wheels of a vehicle. The road wheel connection of the steering shaft 12 may be made electrically, such as in steer-by-wire applications. The steering shaft 12 is at least partially surrounded by an upper jacket 14 that extends within a lower jacket 16.

Figure 2:
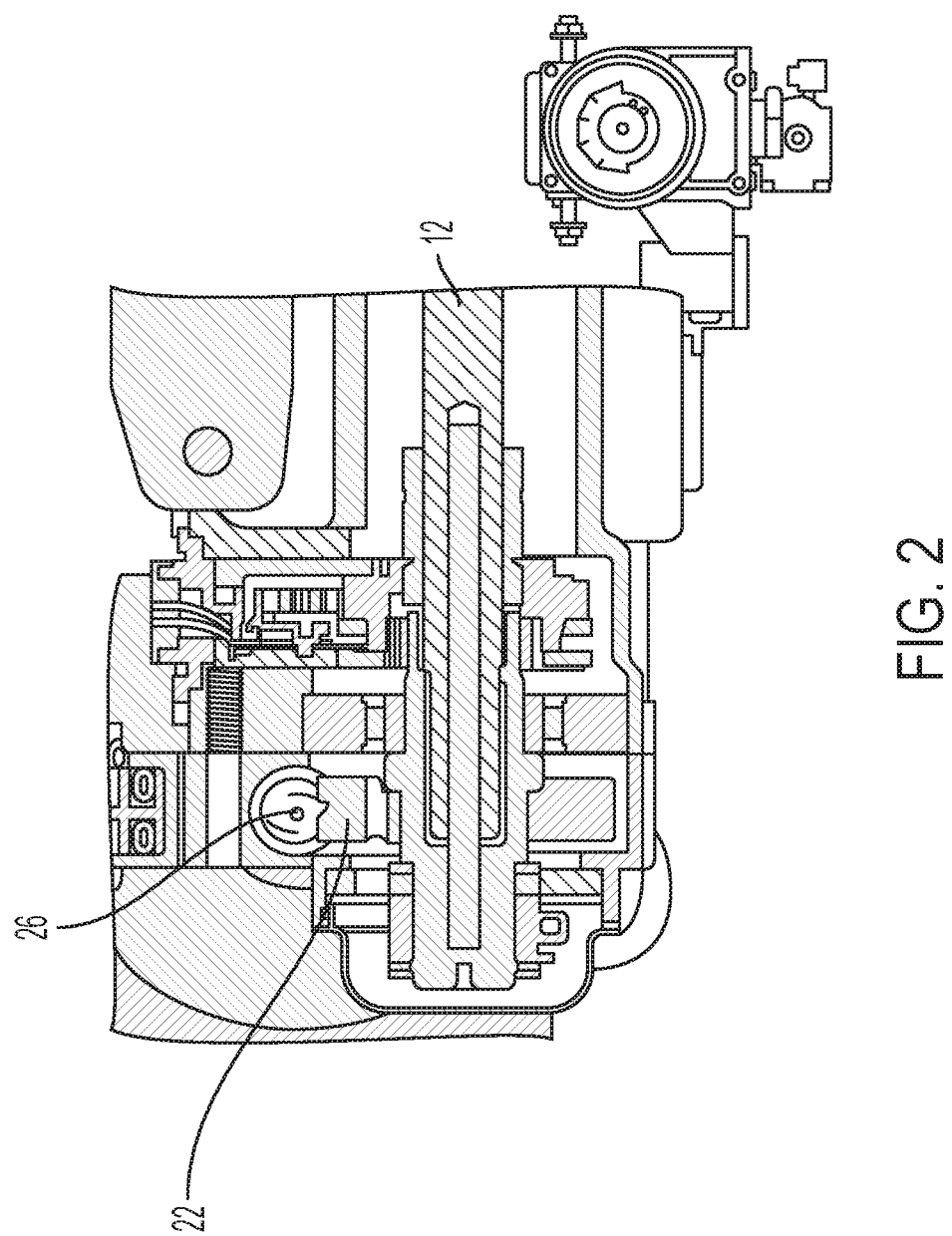
FIG. 2 is a cross-sectional view of a portion of the power steering assembly.

Referring now to FIG. 2, with continued reference to FIG. 1, a power steering assembly 20 is provided to assist an operator of the vehicle with steering maneuvers carried out with the steering column assembly 10. The power steering assembly 20 includes a worm gear 22 at least partially disposed within a first housing 24. In the illustrated embodiment, a portion of the lower jacket 16 is the first housing 24, as they are an integrally formed part. The power steering assembly 20 also includes a worm 26 that is at least partially disposed within a second housing 28 that also houses an electric actuator, such as an electric motor.

Figure 4:
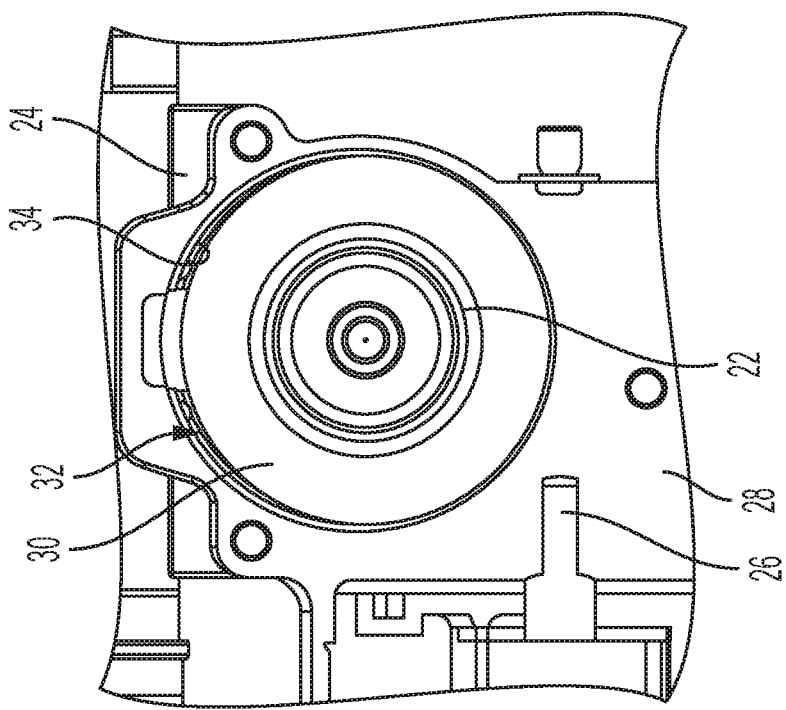
FIG. 4 is an elevational view of the worm gear assembly according to another aspect of the disclosure.
Figure 3:
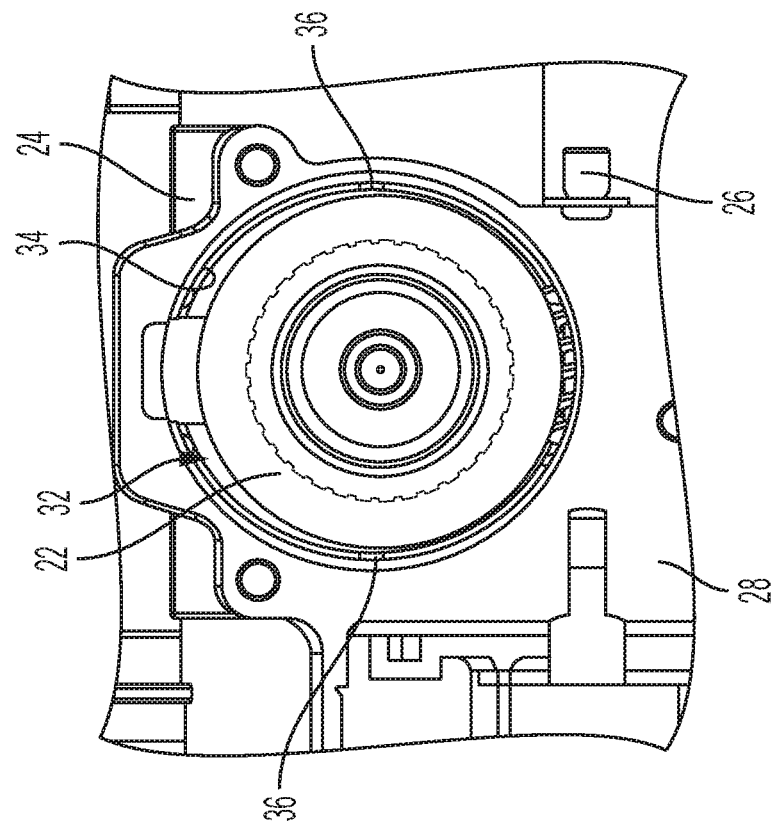
FIG. 3 is an elevational view of a worm gear assembly of the power steering assembly.

Referring now to FIGS. 3 and 4, threads of the worm 26 are arranged to engage the worm gear 22 such that rotation of the worm 26 causes rotation of the worm gear 22. The worm gear 22 is operatively coupled to the steering shaft 12 to provide a torque to the steering shaft 12 to either assist the driver during turning maneuvers (i.e., EPS) or for resistance that gives road feedback to a driver (i.e., steer-by-wire).

The illustrated view of FIGS. 3 and 4 show the first housing 24 and the second housing 28. A worm gear axis bearing 30 is press fit within the first housing 24. To retain axial loads on the worm gear axis of rotation. The worm gear axis bearing 30 is sized and positioned to protrude out of the first housing 24. In other words, the worm gear axis bearing 30 is proud of the plane of the first housing 24. The portion of the worm gear axis bearing 30 that is proud of the first housing 24 is utilized as a pilot to the second housing 28. Using the worm gear axis bearing 30 to control the assembly positioning of the second housing 28 reduces tolerance stack between the first housing 24 and the second housing 28.

As shown best in FIG. 3, the second housing 28 defines an aperture 32 that surrounds the worm gear axis bearing 30 (i.e., piloted portion). Specifically, the aperture 32 is defined by an aperture wall 34 of the second housing 28. The aperture wall 34 is substantially circular, but includes one or more flat segments 36. In the illustrated embodiment, two flat segments 36 are included, but it is to be appreciated that more flat segments may be present in other embodiments. The flat segments are circumferentially spaced from each other and may be equally spaced from each other. For example, in the illustrated embodiment, the two flat portions are spaced about 180 degrees from each other.

The worm gear axis bearing 30 has a circular cross section. Having the round surface of the worm gear axis bearing 30 sliding on the flat portion(s) 36 of the second housing 28 eliminates binding between the two housings 24, 28.

The above-describe assembly allows the two housings 24, 28 to rotate relative to each other without affecting the backdrive setting, as the housings 24, 28 are only able to rotate on the worm gear axis, which maintains a constant centerline distance between the worm 26 and the worm gear 22. The rotation is then locked using a plurality of fasteners 38 (e.g., bolts) that clamp the two housings 24, 28 together once the desired backdrive setting is achieved.

The embodiments described herein reduce binding on a linear slide for a worm and worm gear backdrive setting. Additionally, the second housing 28 that contains the powerpack is directly aligned to the worm gear axis bearing 30 instead of having to establish alignment with the first housing 24 and then the bearing 30.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A power steering assembly comprising:
a first housing containing a worm gear operatively coupled to a steering shaft, the worm gear rotatable about a worm gear axis;
a second housing containing an electric motor and a worm arranged to engage the worm gear; and
a worm gear axis bearing disposed between the worm gear and an inner surface of the first housing, the worm gear axis bearing protruding from the first housing to position the second housing relative to the worm gear axis.

2. The power steering assembly of claim 1, wherein the second housing includes an aperture wall that defines an aperture for receiving the worm gear axis bearing, the aperture wall including a flat portion.

3. The power steering assembly of claim 2, wherein the flat portion is one of a plurality of flat portions spaced from each other along the aperture wall.

4. The power steering assembly of claim 3, wherein the plurality of flat portions consist of two flat portions spaced 180 degrees from each other.

5. The power steering assembly of claim 3, wherein the flat portion is in sliding engagement with the worm gear axis bearing during assembly.

6. The power steering assembly of claim 1, wherein the assembly is part of a steer-by-wire steering system.

7. A power steering assembly comprising:
a first housing containing a worm gear operatively coupled to a steering shaft, the worm gear rotatable about a worm gear axis;
a second housing containing an electric motor and a worm arranged to engage the worm gear;
a worm gear axis bearing protruding from the first housing to position the second housing relative to the worm gear axis; and
an aperture wall of the second housing that defines an aperture for receiving the worm gear axis bearing, the aperture wall including a pair of flat portions for engaging a rounded exterior of the worm gear axis bearing.

8. The power steering assembly of claim 7, wherein the plurality of flat portions consist of two flat portions spaced 180 degrees from each other.

9. The power steering assembly of claim 8, wherein the flat portion is in sliding engagement with the worm gear axis bearing during assembly.

10. The power steering assembly of claim 7, wherein the assembly is part of a steer-by-wire steering system.

11. A method of assembling a power steering assembly comprising:
press fitting a worm gear axis bearing around a portion of a worm gear and into a first housing, the worm gear axis bearing protruding from the first housing;
positioning the worm gear axis within an aperture defined by an aperture wall of a second housing;
sliding the second housing along the worm gear axis bearing; and
coupling the second housing to the first housing with a plurality of mechanical fasteners.

12. The method of claim 11, wherein sliding the second housing along the worm gear axis bearing comprises sliding the worm gear axis bearing along a pair of flat portions of the aperture wall.

13. The method of claim 12, wherein the flat portions are spaced 180 degrees from each other.

* * * * *